US012753264B2

(12) United States Patent
Osumi et al.

(10) Patent No.: US 12,753,264 B2
(45) Date of Patent: Oct. 6, 2026

(54) METHOD FOR PRODUCING BLOCK COPOLYMER

(71) Applicant: NIPPON SODA CO., LTD., Tokyo (JP)

(72) Inventors: Shota Osumi, Ichihara (JP); Toshifumi Nosaki, Ichihara (JP); Masahiro Umezawa, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 671 days.

(21) Appl. No.: 18/033,149

(22) PCT Filed: Oct. 29, 2021

(86) PCT No.: PCT/JP2021/039983

§ 371 (c)(1),
(2) Date: Apr. 21, 2023

(87) PCT Pub. No.: WO2022/097575

PCT Pub. Date: May 12, 2022

(65) Prior Publication Data

US 2023/0399451 A1 Dec. 14, 2023

(30) Foreign Application Priority Data

Nov. 9, 2020 (JP) ................................ 2020-186761

(51) Int. Cl.
*C08F 297/04* (2006.01)
*C08F 212/08* (2006.01)
*C08F 236/06* (2006.01)

(52) U.S. Cl.
CPC .................................. *C08F 297/04* (2013.01)

(58) Field of Classification Search
None
See application file for complete search history.

(56) References Cited

U.S. PATENT DOCUMENTS

| | | | |
|---|---|---|---|
| 2005/0038198 | A1 | 2/2005 | Morishita et al. |
| 2008/0287559 | A1 | 11/2008 | King et al. |
| 2018/0022913 | A1 | 1/2018 | Hori et al. |
| 2023/0051549 | A1 | 2/2023 | Tando et al. |

FOREIGN PATENT DOCUMENTS

| | | | | | |
|---|---|---|---|---|---|
| CN | 107207812 | A | | 9/2017 | |
| JP | H06-192502 | A | | 7/1994 | |
| JP | 2001172324 | A | * | 6/2001 | |
| JP | 2009-516019 | A | | 4/2009 | |
| JP | 2010280853 | A | * | 12/2010 | |
| WO | WO-2020070406 | A1 | * | 4/2020 | ............... B60C 1/00 |
| WO | 2021/153455 | A1 | | 8/2021 | |

OTHER PUBLICATIONS

Dec. 21, 2021 International Search Report issued in International Patent Application No. PCT/JP2021/039983.

* cited by examiner

*Primary Examiner* — Ha S Nguyen
(74) *Attorney, Agent, or Firm* — Oliff PLC

(57) ABSTRACT

A method for producing a block copolymer that includes a step (A) of polymerizing a vinyl aromatic monomer at −5° C. to 35° C. in a mixed solvent including at least one nonpolar solvent selected from methylcyclohexane and methylcyclopentane and an aprotic polar solvent using an anionic polymerization initiator; a step (B) of adding a conjugated diene monomer for further polymerization at −5° C. to 35° C. after the step (A); and a step (C) of adding a vinyl aromatic monomer for further polymerization at −5° C. to 35° C. after the step (B) if necessary.

14 Claims, No Drawings

METHOD FOR PRODUCING BLOCK COPOLYMER

TECHNICAL FIELD

The present invention relates to a method for producing a block copolymer. The present application claims priority to Japan Patent Application No. 2020-186761, filed on Nov. 9, 2020, and the contents thereof are incorporated herein.

BACKGROUND ART

Block copolymers containing blocks obtained by polymerizing conjugated diene monomers and blocks obtained by polymerizing vinyl aromatic monomers may be thermally cured to obtain cured products excellent in water resistance, heat resistance, insulating properties, adhesion to substrate, and the like. Those cured products are applied to general industrial articles. It is known that the block copolymers may be produced by anionic polymerization. The block copolymers are required to be produced as block copolymers having the most suitable molecular weights, molecular weight distributions, and composition ratios depending on uses.

Patent Document 1 discloses that 4,000 g of tetrahydrofuran, 220 g of a styrene monomer, 0.7 g of n-butyllithium were added to an autoclave made of aluminum for polymerization at 70° C. for 60 minutes, and 560 g of a 1,3-butadiene monomer was then added for polymerization for 150 minutes, 220 g of a styrene monomer was finally added for polymerization for 60 minutes, a large amount of methanol was added to stop the reaction, and a styrene-butadiene-styrene block copolymer was then obtained. The obtained block copolymer seems to have had a bound styrene content of 41%, a 1,2-vinyl bond amount of 86% in butadiene blocks, and a number average molecular weight of 92000.

PRIOR ART DOCUMENT

Patent Document

Patent Document 1: Japanese unexamined Patent Application Publication No. 06-192502

SUMMARY OF THE INVENTION

Object to be Solved by the Invention

In the method described in Patent Document 1, tetrahydrofuran that was the solvent and n-butyllithium that was the polymerization initiator may cause a side reaction, and some of the polymerization initiator may be deactivated. Some problems were that a polymer having a prescribed molecular weight was not obtained consequently, and that the molecular weight distribution (Mw/Mn) increased. The above-mentioned side reaction may be reduced by changing tetrahydrofuran into a nonpolar solvent and by adjusting the polymerization temperature to −20° C. or less. In this case, the polymerization may not, however, be completed due to a low polymerization rate. The polymerization reaction was required to be performed in a temperature range that is not high temperature or low temperature, namely in a temperature range of −5° C. to 35° C. It is because special heating equipment or cooling equipment does not need to be used, and the polymerization reaction is advantageously performed in the temperature range from the viewpoint of industrial production methods. An object of the present invention is to provide a method that enables producing a target block copolymer at a temperature of −5° C. to 35° C.

Means to Solve the Object

The present inventors have earnestly examined to solve the above-mentioned problem and consequently completed the present invention. The present invention includes the following aspects.

(1) A method for producing a block copolymer, the method comprising:

a step (A) of polymerizing a vinyl aromatic monomer in a mixed solvent comprising at least one nonpolar solvent selected from methylcyclohexane and methylcyclopentane and an aprotic polar solvent by using an anionic polymerization initiator, at −5° C. to 35° C.; and a step (B) of adding a conjugated diene monomer for further polymerization at −5° C. to 35° C. after the step (A).

(2) A method for producing a block copolymer, the method comprising:

a step (A) of polymerizing a vinyl aromatic monomer at in a mixed solvent comprising at least one nonpolar solvent selected from methylcyclohexane and methylcyclopentane and an aprotic polar solvent by using an anionic polymerization initiator, at −5° C. to 35° C.;

a step (B) of adding a conjugated diene monomer for further polymerization at −5° C. to 35° C. after the step (A); and a step (C) of adding a vinyl aromatic monomer for further polymerization at −5° C. to 35° C. after the step (B).

(3) The method for producing a block copolymer according to (1) or (2), wherein, with respect to contents of the at least one nonpolar solvent selected from methylcyclohexane and methylcyclopentane, and the aprotic polar solvent, the content of the aprotic polar solvent is 5 to 20 parts by weight with respect to 100 parts by weight of the at least one nonpolar solvent selected from methylcyclohexane and methylcyclopentane.

(4) The method for producing a block copolymer according to any one of (1) to (3), wherein the aprotic polar solvent is an ether solvent.

(5) The method for producing a block copolymer according to (4), wherein the ether solvent is tetrahydrofuran.

(6) The method for producing a block copolymer according to any one of (1) to (5), wherein the anionic polymerization initiator is an alkyllithium.

(7) The method for producing a block copolymer according to any one of (1) to (6), wherein the vinyl aromatic monomer is a styrene-based monomer.

(8) The method for producing a block copolymer according to (7), wherein the styrene-based monomer is styrene.

(9) The method for producing a block copolymer according to any one of (1) to (8), wherein the conjugated diene monomer is 1,3-butadiene.

Effect of the Invention

According to a method for producing a polymer of the present invention, polymerization reaction may be performed in a temperature range of −5° C. to 35° C. Since the side reaction during the polymerization may be suppressed, a target block copolymer may be produced.

MODE OF CARRYING OUT THE INVENTION (Block Copolymer)

A block copolymer to which a production method of the present invention is directed is a block copolymer comprising a block containing a repeating unit derived from a vinyl aromatic monomer and a block containing a repeating unit derived from a conjugated diene monomer. The block copolymer is preferably a block copolymer consisting only of a block containing a repeating unit derived from a conjugated diene monomer and a block containing a repeating unit derived from a vinyl aromatic monomer. The block copolymer may be a linear block copolymer, a graft block copolymer, or a star block copolymer. Among these, the linear block copolymer is preferable. The terminals of the block copolymer may be modified with various chemically acceptable structures. Among those, the terminals of the block copolymer preferably have unmodified structures.

The block containing the repeating unit derived from the vinyl aromatic monomer is a block in which only the vinyl aromatic monomer is polymerized or a block in which the vinyl aromatic monomer and a monomer other than the vinyl aromatic monomer (however, except the conjugated diene monomer) are copolymerized. The block containing the repeating unit derived from the vinyl aromatic monomer is preferably a block in which only the vinyl aromatic monomer is polymerized. Several blocks containing the repeating unit derived from the vinyl aromatic monomer may be contained in the block copolymer.

Although the vinyl aromatic monomer is not particularly limited, as the vinyl aromatic monomer, styrene; α-methylstyrene; a styrene-based monomer such as styrene substituted with alkoxy groups; 2-vinylpyridine; 4-vinylpyridine; vinylnaphthalene; vinylnaphthalene substituted with alkyl groups; or the like may be exemplified. These may be used alone or used by combination of two or more thereof. Among these, the vinyl aromatic monomer is preferably a styrene-based monomer, and more preferably styrene.

As the monomer other than the vinyl aromatic monomer copolymerized with the vinyl aromatic monomer, the conjugated diene monomer is excluded. As the monomer other than the vinyl aromatic monomer, a (meth)acrylic acid ester monomer or the like may be exemplified.

The block containing the repeating unit derived from the conjugated diene monomer is a block in which only the conjugated diene monomer is polymerized or a block in which the conjugated diene monomer and a monomer other than the conjugated diene monomer (however, except the vinyl aromatic monomer) are copolymerized. The block containing the repeating unit derived from the conjugated diene monomer is preferably a block only the conjugated diene monomer is polymerized. Several blocks containing the repeating unit derived from the conjugated diene monomer may be contained in the block copolymer. Some or all of carbon-carbon double bonds in the repeating unit derived from the conjugated diene monomer may be hydrogenated.

Although the conjugated diene monomer is not particularly limited, as the conjugated diene monomer, 1,3-butadiene, isoprene, piperylene, 1-phenyl-1,3-butadiene, (2Z,4E)-3,4-dimethyl-2,4-hexadiene, 2,3-dimethyl-1,3-butadiene, or the like may be exemplified. These may be used alone or used by combination of two or more thereof. Among these, the conjugated diene monomer is preferably 1,3-butadiene or isoprene.

As the monomer other than the conjugated diene monomer copolymerizing with the conjugated diene monomer, the vinyl aromatic monomer is excluded. As the monomer other than the conjugated diene monomer, a (meth)acrylic acid ester monomer or the like may be exemplified.

In using 1,3-butadiene as the conjugated diene monomer, the repeating unit derived from 1,3-butadiene may be represented by a 1,2-bond structure [I] and/or a 1,4-bond structure [II]. In a block containing the repeating unit derived from 1,3-butadiene, the molar ratio of the 1,2-bond structure [I] to the 1,4-bond structure [II] is preferably 90:10 to 100:0. Some or all of carbon-carbon double bonds in the 1,2-bond structure [I] and the 1,4-bond structure [II] may be hydrogenated.

[I]

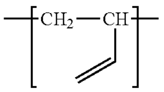

[II]

$$-\!\left[ CH_2-HC=CH-CH_2 \right]\!-$$

Although other blocks that may be contained besides the block containing the repeating unit derived from the conjugated diene monomer and the block containing the repeating unit derived from the vinyl aromatic monomer is not particularly limited, as the block, a block consisting of a repeating unit derived from a (meth)acrylic acid ester monomer or the like may be exemplified. Although the content of the other blocks that may be contained besides the block containing the repeating unit derived from the conjugated diene monomer and the block containing the repeating unit derived from the vinyl aromatic monomer is not particularly limited, the content may be selected from 50% by weight or less, 40% by weight or less, 30% by weight or less, 20% by weight or less, 10% by weight or less, and the like in the block copolymer.

As the block copolymer containing the block containing the repeating unit derived from the conjugated diene monomer and the block containing the repeating unit derived from the vinyl aromatic monomer, a styrene-butadiene block copolymer, a styrene-isoprene block copolymer, a styrene-butadiene-styrene block copolymer, a styrene-isoprene-styrene block copolymer, a butadiene-styrene-butadiene block copolymer, hydrogenated products thereof, or the like may be exemplified. Among these, the styrene-butadiene-styrene block copolymer (SBS) is preferable.

Although the weight ratio of the block containing the repeating unit derived from the conjugated diene monomer to the block containing the repeating unit derived from the vinyl aromatic monomer in the block copolymer is not particularly limited, as the weight ratio, 10:90 to 80:20, 10:90 to 70:30, 10:90 to 60:40, 20:80 to 80:20, 30:70 to 80:20, 40:60 to 80:20, or the like may be exemplified. Among these, the weight ratio is preferably 10:90 to 80:20, 10:90 to 70:30, or 10:90 to 60:40.

Although the number average molecular weight (Mn) of the block copolymer is not particularly limited, as the number average molecular weight, 2,000 to 100,000, 2,000 to 80,000, 2,000 to 60,000, 2,000 to 50,000, 2,000 to 40,000, and the like may be exemplified. Although the molecular weight distribution (also referred to as the degree of dispersion) (Mw/Mn) of the block copolymer is not particularly limited, as the molecular weight distribution, 1 to 5, 1 to 3, or the like may be exemplified. The number average molecular weight (Mn) and the molecular weight distribution (Mw/Mn) are measured by gel permeation chromatograph (GPC) using polystyrene as a standard substance. The measurement conditions thereof are mobile phase: THF (tetrahydrofuran), mobile phase flow rate: 1 mL/minute, column temperature: 40° C., sample injection amount: 40 μl, and sample concentration: 2% by weight.

(Method for Producing Block Copolymer)

A method for producing a block copolymer of the present invention comprises a step (A) of polymerizing a vinyl aromatic monomer in a mixed solvent containing a nonpolar solvent and an aprotic polar solvent using an anionic polymerization initiator at −5° C. to 35° C. and a step (B) of adding a conjugated diene monomer for further polymerization at −5° C. to 35° C. after the step (A). The method optionally comprises a step (C) of adding a vinyl aromatic monomer for further polymerization at −5° C. to 35° C. after the step (B).

(Step (A))

The step A is a step of polymerizing the vinyl aromatic monomer described above at −5° C. to 35° C. in the mixed solvent containing the nonpolar solvent and the aprotic polar solvent using the anionic polymerization initiator.

Although, as the nonpolar solvent, methylcyclohexane and methylcyclopentane may be exemplified, the nonpolar solvent is preferably methylcyclohexane. These solvents may be used alone or used as a mixed solvent of two thereof.

As the aprotic polar solvent, an ether solvent such as diethyl ether, cyclopropyl methyl ether, tetrahydrofuran (THF), dioxane, or trioxane; a tertiary amine such as tetramethylethylenediamine; hexamethylphosphoric triamide; or the like may be exemplified. Among these, an ether solvent is preferable, and tetrahydrofuran is more preferable. These solvents may be used alone or used as a mixed solvent of two or more thereof.

Although the amounts of the at least one solvent selected from methylcyclohexane and methylcyclopentane and the aprotic polar solvent are not particularly limited, aprotic polar solvent amount ranges such as 5 to 20 parts by weight and 5 to 15 parts by weight with respect to 100 parts by weight of the at least one solvent selected from methylcyclohexane and methylcyclopentane may be exemplified.

Although the total amount of the solvent used may be appropriately set by the scale of the reaction and the like, the solvent having a weight that is 1 to 100 times, 1 to 50 times, 1 to 30 times, or 1 to 20 times the weight of the block copolymer to be produced may usually be used.

As long as the anionic polymerization initiator is an anionic species that may polymerize anionic polymerizable unsaturated bonds, the anionic polymerization initiator is not particularly limited. Specifically, organic alkali metals, organic alkaline-earth metals, carbon anionic species derived from 1,1-diphenylethylene or stilbene, or the like may be exemplified. More specifically, an alkyllithium such as ethyl lithium, n-butyllithium, sec-butyllithium, or t-butyllithium; ethyl sodium; lithium biphenyl; lithium naphthalene; sodium naphthalene; potassium naphthalene; α-methylstyrene naphthalene dianion; 1,1-diphenylhexyllithium; 1,1-diphenyl-3-methylpentyl lithium; 1,4-dilithio-2-butene; 1,6-dilithiohexane; polystyryllithium; cumyl potassium; cumyl cesium; or the like may be illustrated. The anionic polymerization initiator to be used for the present invention may be used alone or used by combination of two or more thereof.

The temperature of the polymerization reaction may be selected from ranges such as −5 to 35° C., −5 to 30° C., 0 to 35° C., and 0 to 30° C.

In the polymerization reaction, the vinyl aromatic monomer may be added to the mixed solvent containing the at least one solvent selected from methylcyclohexane and methylcyclopentane and the aprotic polar solvent, and then the anionic polymerization initiator may be added.

Alternatively, the anionic polymerization initiator may be added to the mixed solvent containing the at least one solvent selected from methylcyclohexane and methylcyclopentane and the aprotic polar solvent, and then the vinyl aromatic monomer may be added. Or the vinyl aromatic monomer and the anionic polymerization initiator may be added to the mixed solvent containing the at least one solvent selected from methylcyclohexane and methylcyclopentane and the aprotic polar solvent at almost the same time.

The polymerization reaction is preferably performed in the presence of inert gas. Although the polymerization time may be appropriately set depending on the reaction scale and the like, the polymerization time is usually 0.1 to 100 hours, and preferably 1 to 24 hours.

(Step (B))

The step (B) of the production method of the present invention is a step of adding the conjugated diene monomer described above for further polymerization after the step (A). The conjugated diene monomer may be continuously added, or may be divided into a plurality of portions, and the portions may be added. The conjugated diene monomer may be undiluted or diluted with the aprotic solvent for addition.

The conjugated diene monomer may be polymerized from the terminal anions of the blocks obtained in the step (A) containing the repeating unit derived from the vinyl aromatic monomer for growth to produce the block copolymer of the present invention.

Although the amounts of the at least one solvent selected from methylcyclohexane and methylcyclopentane and the aprotic polar solvent in the step (B) are not particularly limited, aprotic polar solvent amount ranges such as 5 to 20 parts by weight and 5 to 15 parts by weight with respect to 100 parts by weight of the at least one solvent selected from methylcyclohexane and methylcyclopentane may be exemplified.

As a solvent to be used in the step (B), generally, the solvent to be used in the step (A) is successively used, but the same or different solvent may also be newly added. As the aprotic polar solvent, the same may be illustrated as illustrated in the step (A).

The temperature of the polymerization reaction may be selected from ranges such as −5 to 35° C., −5 to 30° C., 0 to 35° C., and 0 to 30° C.

The polymerization reaction is preferably performed in the presence of inert gas. Although the polymerization time may be appropriately set depending on the reaction scale and the like, the polymerization time is usually 0.1 to 100 hours, and preferably 1 to 24 hours.

(Step (C))

The step (C) is an optional step. The step (C) of the production method of the present invention is a step of adding the vinyl aromatic monomer described above for further polymerization after the step (B). The vinyl aromatic monomer may be continuously added, or may be divided into a plurality of portions, and the portions may be added. The vinyl aromatic monomer may be undiluted or diluted with the aprotic solvent for addition.

The vinyl aromatic monomer may be polymerized from the terminal anions of the blocks obtained in the step (B) containing the repeating unit derived from the conjugated diene monomer for growth to produce the block copolymer of the present invention.

Although the amounts of the at least one solvent selected from methylcyclohexane and methylcyclopentane and the aprotic polar solvent in the step (C) are not particularly limited, aprotic polar solvent amount ranges such as 5 to 20 parts by weight and 5 to 15 parts by weight with respect to 100 parts by weight of the at least one solvent selected from methylcyclohexane and methylcyclopentane may be exemplified.

As the solvent to be used in the step (C), generally, the solvent to be used in the step (A) is successively used, but the same or different solvent may be newly added. As the aprotic polar solvent, the same may be illustrated as illustrated in the step (A).

The temperature of the polymerization reaction may be selected from ranges such as −5 to 35° C., −5 to 30° C., 0 to 35° C., and 0 to 30° C.

The polymerization reaction is preferably performed in the presence of inert gas. Although the polymerization time may be appropriately set depending on the reaction scale and the like, the polymerization time is usually 0.1 to 100 hours, and preferably 1 to 24 hours.

After quenching by a method to be usually performed, the obtained block copolymer may be purified by a purification method to be usually performed. Metal impurities derived from the anionic polymerization initiator may be removed depending on the use of the copolymer. As the method for removing the metal impurities, the washing treatment of the block copolymer using an aqueous acid solution such as hydrochloric acid, an aqueous formic acid solution, an aqueous acetic acid solution, an aqueous propionic acid solution, or an aqueous citric acid solution, adsorption treatment using an adsorbent such as an ion exchange resin, or the like is exemplified.

Some or all of the carbon-carbon double bonds contained in the obtained block copolymer may be hydrogenated by a common method.

EXAMPLES

Then, the present invention will be described more specifically by showing the Examples. However, the technical scope of the present invention is not limited to the Examples.

Example 1

218.62 g of methylcyclohexane (hereinafter abbreviated to MCH) and 24.29 g of tetrahydrofuran (hereinafter abbreviated to THF) were added to a 500-mL flask, and the temperature in the system was adjusted to 20° C. Then, 2.95 g of n-butyllithium (15.1%, solution in n-hexane) was added, and immediately, 15.47 g of styrene in a dropping funnel was dropped. After the dropping, the mixture was matured for 10 minutes, and the disappearance of the monomer was confirmed by GC. Then, 30.00 g of butadiene was dropped. After the maturation for 15 minutes, 15.43 g of styrene was then dropped. After the maturation for 30 minutes, 0.42 g of pure water was added to stop the reaction. The obtained reaction liquid was water-washed, the upper layer was then collected, and the solvent was removed by distillation under reduced pressure. The residue was then vacuum-dried at 80° C. for 5 hours to obtain a white solid resin. The molecular weight of the obtained resin was evaluated by gel permeation chromatography (hereinafter abbreviated to GPC, polystyrene standard) measurement, and the rate of 1,2-vinyl bonds in the butadiene units of the resin was evaluated by $^{1}$H-NMR measurement. Consequently, the number average molecular weight (Mn) was 14, 702, the degree of dispersion (Mw/Mn) was 1.05, and the rate of 1,2-vinyl bonds was 91'. The weight ratio between the butadiene blocks and the styrene blocks in the block copolymer was as follows: polystyrene/polybutadiene/polystyrene=27/46/27.

Example 2

218.26 g of MCH and 24.11 g of THF were added to a 500-mL flask, and the temperature in the system was adjusted to 0° C. Then, 2.72 g of n-butyllithium (15.1%, solution in n-hexane) was added, and immediately, 14.82 g of styrene in a dropping funnel was dropped. After the dropping, the mixture was matured for 10 minutes, and the disappearance of the monomer was confirmed by GC. Then, 33.85 g of butadiene was dropped. After the maturation for 60 minutes, 14.80 g of styrene was dropped. After the maturation for 30 minutes, 0.55 g of pure water was added to stop the reaction. The obtained reaction liquid was water-washed, the upper layer was then collected, and the solvent was removed by distillation under reduced pressure. The residue was then vacuum-dried at 80° C. for 5 hours to obtain a white solid resin. The molecular weight of the obtained resin was evaluated by GPC measurement, and the rate of 1,2-vinyl bonds in the butadiene units of the resin was evaluated by $^{1}$H-NMR measurement. Consequently, the number average molecular weight (Mn) was 21,140, the degree of dispersion (Mw/Mn) was 1.14, and the rate of 1,2-vinyl bonds was 96%. The weight ratio between the butadiene blocks and the styrene blocks in the block copolymer was as follows: polystyrene/polybutadiene/polystyrene=25/50/25.

Example 3

215.89 g of MCH and 23.95 g of THF were added to a 500-mL flask, and the temperature in the system was adjusted to 10° C. Then, 2.63 g of n-butyllithium (15.1%, solution in n-hexane) was added, and immediately, 14.88 g of styrene in a dropping funnel was dropped. After the dropping, the mixture was matured for 10 minutes, and the disappearance of the monomer was confirmed by GC. Then, 33.21 g of butadiene was dropped. After the maturation for 30 minutes, 15.14 g of styrene was dropped. After the maturation for 30 minutes, 0.55 g of pure water was added to stop the reaction. The obtained reaction liquid was water-washed, the upper layer was then collected, and the solvent was removed by distillation under reduced pressure. The residue was then vacuum-dried at 80° C. for 5 hours to obtain a white solid resin. The molecular weight of the obtained resin was evaluated by GPC measurement, and the rate of 1,2-vinyl bonds in the butadiene units of the resin was evaluated by $^{1}$H-NMR measurement. Consequently, the number average molecular weight (Mn) was 16, 453, the degree of dispersion (Mw/Mn) was 1.15, and the rate of 1,2-vinyl bonds was 93%. The weight ratio between the butadiene blocks and the styrene blocks in the block copolymer was as follows: polystyrene/polybutadiene/polystyrene=27/46/27.

Example 4

216.01 g of MCH and 24.00 g of THF were added to a 500-mL flask, and the temperature in the system was adjusted to 30° C. Then, 2.96 g of n-butyllithium (15.1%, solution in n-hexane) was added, and immediately, 15.08 g of styrene in a dropping funnel was dropped. After the dropping, the mixture was matured for 10 minutes, and the disappearance of the monomer was confirmed by GC. Then, 32.30 g of butadiene was dropped. After the maturation for 15 minutes, 15.21 g of styrene was dropped. After the maturation for 30 minutes, 0.62 g of pure water was added to stop the reaction. The obtained reaction liquid was water-washed, the upper layer was then collected, and the solvent was removed by distillation under reduced pressure. The residue was then vacuum-dried at 80° C. for 5 hours to obtain a white solid resin. The molecular weight of the obtained resin was evaluated by GPC measurement, and the rate of 1,2-vinyl bonds in the butadiene units of the resin was evaluated by $^{1}$H-NMR measurement. Consequently, the number average molecular weight (Mn) was 19,560, the degree of dispersion (Mw/Mn) was 1.18, and the rate of 1,2-vinyl bonds was 90%. The weight ratio between the butadiene blocks and the styrene blocks in the block copolymer was as follows: polystyrene/polybutadiene/polystyrene=26/48/26.

Example 5

219.07 g of MCH and 25.70 g of THF were added to a 500-mL flask, and the temperature in the system was adjusted to 20° C. Then, 9.01 g of n-butyllithium (15.1%, solution in n-hexane) was added, and immediately, 6.21 g of styrene in a dropping funnel was dropped. After the dropping, the mixture was matured for 10 minutes, and the disappearance of the monomer was confirmed by GC. Then, 53.53 g of butadiene was dropped. After the maturation for 15 minutes, 6.21 g of styrene was dropped. After the maturation for 30 minutes, 1.66 g of pure water was added to stop the reaction. The obtained reaction liquid was water-washed, the upper layer was then collected, and the solvent was removed by distillation under reduced pressure to obtain a colorless and transparent viscous liquid. The molecular weight of the obtained resin was evaluated by GPC measurement, and the rate of 1,2-vinyl bonds in the butadiene units of the resin was evaluated by $^{1}$H-NMR measurement. Consequently, the number average molecular weight (Mn) was 5,723, the degree of dispersion (Mw/Mn) was 1.07, and the rate of 1,2-vinyl bonds was 90%. The weight ratio between the butadiene blocks and the styrene blocks in the block copolymer was as follows: polystyrene/polybutadiene/polystyrene=9/82/9.

Example 6

215.72 g of MCH and 23.95 g of THF were added to a 500-mL flask, and the temperature in the system was adjusted to 0° C. Then, 8.37 g of n-butyllithium (15.1%, solution in n-hexane) was added, and immediately, 6.01 g of styrene in a dropping funnel was dropped. After the dropping, the mixture was matured for 10 minutes, and the disappearance of the monomer was confirmed by GC. Then, 47.00 g of butadiene was dropped. After the maturation for 15 minutes, 5.89 g of styrene was dropped. After the maturation for 30 minutes, 1.66 g of pure water was added to stop the reaction. The obtained reaction liquid was water-washed, the upper layer was then collected, and the solvent was removed by distillation under reduced pressure to obtain a colorless and transparent viscous liquid. The molecular weight of the obtained resin was evaluated by GPC measurement, and the rate of 1,2-vinyl bonds in the butadiene units of the resin was evaluated by $^{1}$H-NMR measurement. Consequently, the number average molecular weight (Mn) was 6,141, the degree of dispersion (Mw/Mn) was 1.04, and the rate of 1,2-vinyl bonds was 95%. The weight ratio between the butadiene blocks and the styrene blocks in the block copolymer was as follows: polystyrene/polybutadiene/polystyrene=9/82/9.

Example 7

215.83 g of MCH and 24.04 g of THF were added to a 500-mL flask, and the temperature in the system was adjusted to 10° C. Then, 8.44 g of n-butyllithium (15.1%, solution in n-hexane) was added, and immediately, 6.30 g of styrene in a dropping funnel was dropped. After the dropping, the mixture was matured for 10 minutes, and the disappearance of the monomer was confirmed by GC. Then, 49.52 g of butadiene was dropped. After the maturation for 15 minutes, 5.75 g of styrene was dropped. After the maturation for 30 minutes, 1.66 g of pure water was added to stop the reaction. The obtained reaction liquid was water-washed, the upper layer was then collected, and the solvent was removed by distillation under reduced pressure to obtain a colorless and transparent viscous liquid. The molecular weight of the obtained resin was evaluated by GPC measurement, and the rate of 1,2-vinyl bonds in the butadiene units of the resin was evaluated by $^{1}$H-NMR measurement. Consequently, the number average molecular weight (Mn) was 5,804, the degree of dispersion (Mw/Mn) was 1.05, and the rate of 1,2-vinyl bonds was 96%. The weight ratio between the butadiene blocks and the styrene blocks in the block copolymer was as follows: polystyrene/polybutadiene/polystyrene=10/80/10.

Example 8

216.56 g of MCH and 24.06 g of THF were added to a 500-mL flask, and the temperature in the system was adjusted to 30° C. Then, 8.60 g of n-butyllithium (15.1%, solution in n-hexane) was added, and immediately, 6.30 g of styrene added to a dropping funnel was dropped. After the dropping, the mixture was matured for 10 minutes, and the disappearance of the monomer was confirmed by GC. Then, 54.30 g of butadiene was dropped. After the maturation for 15 minutes, 5.75 g of styrene was dropped. After the maturation for 30 minutes, 1.66 g of pure water was added to stop the reaction. The obtained reaction liquid was water-washed, the upper layer was then collected, and the solvent was removed by distillation under reduced pressure to obtain a colorless and transparent viscous liquid. The molecular weight of the obtained resin was evaluated by GPC measurement, and the rate of 1,2-vinyl bonds in the butadiene units of the resin was evaluated by $^{1}$H-NMR measurement. Consequently, the number average molecular weight (Mn) was 5,029, the degree of dispersion (Mw/Mn) was 1.07, and the rate of 1,2-vinyl bonds was 91%. The weight ratio between the butadiene blocks and the styrene blocks in the block copolymer was as follows: polystyrene/polybutadiene/polystyrene=10/80/10.

Comparative Example 1

215.94 g of MCH and 24.11 g of THF were added to a 500-mL flask, and the temperature in the system was adjusted to 40° C. Then, 2.69 g of n-butyllithium (15.1%, solution in n-hexane) was added, and immediately 14.84 g of styrene in a dropping funnel was dropped. After the dropping, the mixture was matured for 10 minutes, and the disappearance of the monomer was confirmed by GC. Then, 33.74 g of butadiene was dropped. After the maturation for 15 minutes, 14.88 g of styrene was dropped. After the maturation for 30 minutes, 0.57 g of pure water was added to stop the reaction. The obtained reaction liquid was water-washed, the upper layer was then collected, and the solvent was removed by distillation under reduced pressure. The residue was then vacuum-dried at 80° C. for 5 hours to obtain a white solid resin. The molecular weight of the obtained resin was evaluated by GPC measurement, and the rate of 1,2-vinyl bonds in the butadiene units of the resin was evaluated by $^1$H-NMR measurement. Consequently, the number average molecular weight (Mn) was 24,393, the degree of dispersion (Mw/Mn) was 1.19, and the rate of 1,2-vinyl bonds was 85%. In Comparative Example 1, in which the reaction was performed at 40° C., the initiator efficiency decreased as compared with Examples 1 to 4, and the rate of 1,2-vinyl bonds also decreased. The weight ratio between the butadiene blocks and the styrene blocks in the block copolymer was as follows: polystyrene/polybutadiene/polystyrene=25/50/25.

Comparative Example 2

215.94 g of MCH and 24.06 g of THF were added to a 500-mL flask, and the temperature in the system was adjusted to −10° C. Then, 2.96 g of n-butyllithium (15.1%, solution in n-hexane) was added, and immediately 15.14 g of styrene in a dropping funnel was dropped. After the dropping, the mixture was matured for 10 minutes, and the disappearance of the monomer was confirmed by GC. Then, 34.79 g of butadiene was dropped. After the maturation for 120 minutes, 15.09 g of styrene was dropped. After the maturation for 30 minutes, 0.57 g of pure water was added to stop the reaction. The obtained reaction liquid was water-washed, the upper layer was then collected, and the solvent was removed by distillation under reduced pressure. The residue was then vacuum-dried at 80° C. for 5 hours to obtain a white solid resin. The molecular weight of the obtained resin was evaluated by GPC measurement, and the rate of 1,2-vinyl bonds in the butadiene units of the resin was evaluated by $^1$H-NMR measurement. Consequently, the number average molecular weight (Mn) was 20,512, and the degree of dispersion (Mw/Mn) was 1.23. However, a monomodal peak was not obtained, and peaks derived from the deactivation during the polymerization were observed. The rate of 1,2-vinyl bonds was 94%. The weight ratio between the butadiene blocks and the styrene blocks in the block copolymer was as follows: polystyrene/polybutadiene/polystyrene=10/80/10.

The invention claimed is:

1. A method for producing a block copolymer, the method comprising:

a step (A) of polymerizing a vinyl aromatic monomer in a mixed solvent comprising at least one nonpolar solvent selected from methylcyclohexane and methylcyclopentane and an aprotic polar solvent by using an anionic polymerization initiator, at −5° C. to 35° C.; and a step (B) of adding a conjugated diene monomer for further polymerization at −5° C. to 35° C. after the step (A), wherein the aprotic polar solvent amount is 5 to 20 parts by weight with respect to 100 parts by weight of the at least one nonpolar solvent selected from methylcyclohexane and methylcyclopentane.

2. A method for producing a block copolymer, the method comprising:

a step (A) of polymerizing a vinyl aromatic monomer in a mixed solvent comprising at least one nonpolar solvent selected from methylcyclohexane and methylcyclopentane and an aprotic polar solvent by using an anionic polymerization initiator, at −5° C. to 35° C.;

a step (B) of adding a conjugated diene monomer for further polymerization at −5° C. to 35° C. after the step (A); and a step (C) of adding a vinyl aromatic monomer for further polymerization at −5° C. to 35° C. after the step (B), wherein the aprotic polar solvent amount is 5 to 20 parts by weight with respect to 100 parts by weight of the at least one nonpolar solvent selected from methylcyclohexane and methylcyclopentane.

3. The method for producing a block copolymer according to claim 1, wherein the aprotic polar solvent is an ether solvent.

4. The method for producing a block copolymer according to claim 3, wherein the ether solvent is tetrahydrofuran.

5. The method for producing a block copolymer according to claim 1, wherein the anionic polymerization initiator is an alkyllithium.

6. The method for producing a block copolymer according to claim 1, wherein the vinyl aromatic monomer is a styrene-based monomer.

7. The method for producing a block copolymer according to claim 6, wherein the styrene-based monomer is styrene.

8. The method for producing a block copolymer according to claim 1, wherein the conjugated diene monomer is 1,3-butadiene.

9. The method for producing a block copolymer according to claim 2, wherein the aprotic polar solvent is an ether solvent.

10. The method for producing a block copolymer according to claim 9, wherein the ether solvent is tetrahydrofuran.

11. The method for producing a block copolymer according to claim 2, wherein the anionic polymerization initiator is an alkyllithium.

12. The method for producing a block copolymer according to claim 2, wherein the vinyl aromatic monomer is a styrene-based monomer.

13. The method for producing a block copolymer according to claim 12, wherein the styrene-based monomer is styrene.

14. The method for producing a block copolymer according to claim 2, wherein the conjugated diene monomer is 1,3-butadiene.

* * * * *